US006974538B2

(12) United States Patent
Baumann et al.

(10) Patent No.: US 6,974,538 B2
(45) Date of Patent: Dec. 13, 2005

(54) FUEL FILTER FOR AN INTERNAL COMBUSTION ENGINE

(75) Inventors: Peter Baumann, Stuttgart (DE); Hans Gebert, Heilbronn (DE); Ewald Millich, Metzingen (DE); Albert Schick, Brackenheim (DE)

(73) Assignee: MAHLE Filtersysteme GmbH, Stuttgart (DE)

( * ) Notice: Subject to any disclaimer, the term of this patent is extended or adjusted under 35 U.S.C. 154(b) by 273 days.

(21) Appl. No.: 10/203,469

(22) PCT Filed: Apr. 27, 2001

(86) PCT No.: PCT/DE01/01638

§ 371 (c)(1),
(2), (4) Date: Aug. 12, 2002

(87) PCT Pub. No.: WO01/90564

PCT Pub. Date: Nov. 29, 2001

(65) Prior Publication Data

US 2003/0010687 A1  Jan. 16, 2003

(30) Foreign Application Priority Data

May 23, 2000  (DE) .............................. 100 25 484

(51) Int. Cl.[7] ............................................ B01D 21/24
(52) U.S. Cl. .................... 210/109; 123/511; 123/514; 210/349; 210/429; 210/439
(58) Field of Search .................. 210/109, 116, 130, 210/133, 136, 196, 232, 46.4, 248, 428, 349, 210/444, 416.4, 429, 439; 137/115.27, 510, 137/544, 479, 495, 514; 123/509–511, 514, 123/516

(56) References Cited

U.S. PATENT DOCUMENTS

| 2,658,625 | A | * | 11/1953 | Rafferty ...................... 210/445 |
| 4,287,917 | A |   | 9/1981 | Frey ............................ 138/30 |
| 4,526,378 | A | * | 7/1985 | Fisher et al. ................ 277/617 |
| 4,654,141 | A |   | 3/1987 | Frentzel ...................... 210/232 |
| 5,647,330 | A |   | 7/1997 | Sawert et al. ............... 123/509 |
| 5,649,561 | A |   | 7/1997 | Brandt ................... 137/115.13 |
| 5,727,529 | A | * | 3/1998 | Tuckey ........................ 123/514 |
| 5,738,785 | A | * | 4/1998 | Brown et al. ............... 210/232 |
| 5,770,054 | A | * | 6/1998 | Ardes ........................ 210/130 |
| 5,814,215 | A |   | 9/1998 | Bruss et al. ................ 210/130 |
| 5,989,413 | A | * | 11/1999 | Jauss et al. ................. 210/109 |

FOREIGN PATENT DOCUMENTS

| DE | 35 38 589 | 5/1987 |
| DE | 39 03 675 | 8/1990 |
| DE | 39 33 794 | 4/1991 |
| DE | 44 30 471 | 2/1996 |
| DE | 195 16 545 | 11/1996 |
| DE | 195 23 626 | 1/1997 |
| DE | 197 38 805 | 3/1999 |

(Continued)

Primary Examiner—Joseph Drodge
(74) Attorney, Agent, or Firm—Collard & Roe, P.C.

(57) ABSTRACT

The invention relates to a fuel filter for an internal combustion engine, comprising a filter housing consisting especially of metal, and a filter element and a pressure-regulating valve located in said filter housing. The aim of the invention is to ensure that no noise originating from the pressure-regulating valve is emitted. To this end, the pressure-regulating valve is mounted in the filter housing in such a way that vibrations are dampened.

3 Claims, 1 Drawing Sheet

FOREIGN PATENT DOCUMENTS

Figure 1:
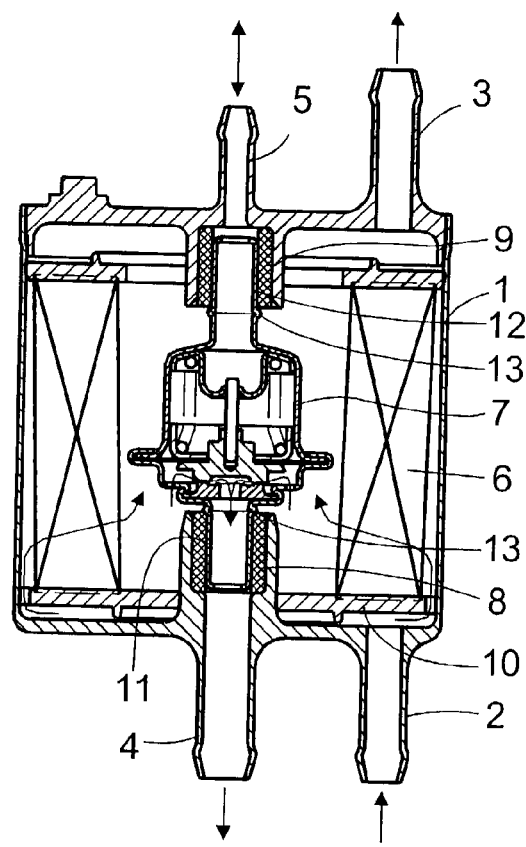

| | | |
|---|---|---|
| DE | 197 53 611 | 6/1999 |
| DE | 197 54 243 | 6/1999 |
| DE | 198 06 929 | 8/1999 |
| EP | 0 702 142 | 9/1995 |
| JP | 02-223664 | 9/1990 |
| JP | 02-223665 | 9/1990 |
| WO | WO97/01705 | 1/1997 |
| WO | WO97/12143 | 4/1997 |

* cited by examiner

FUEL FILTER FOR AN INTERNAL COMBUSTION ENGINE

CROSS REFERENCE TO RELATED APPLICATIONS

Applicants claim priority under 35 U.S.C. §119 of German Application No. 100 25 484.5 filed May 23, 2000. Applicants also claim priority under 35 U.S.C. §365 of PCT/DE01/01638 filed Apr. 27, 2001. The international application under PCT article 21(2) was not published in English.

This invention relates to a fuel filter according to the preamble of Patent claim 1.

Such fuel filters with pressure regulating valves are known from DE 195 23 626 A1, WO 97/12143, WO 97/01705 and EP 0 702 142 A1.

Furthermore, a generic filter is known from DE 197 54 243. This filter has an integrated pressure regulator which is provided with a damping device with a damping plunger, designed as a seat valve. Only the movable parts which serve to open the valve are designed with a vibration damping effect.

This invention is concerned with the problem of preventing all or at least most of the noise emanating from such a filter during operation.

An embodiment of a generic fuel filter according to the characterizing feature of Patent claim 1 presents a basic solution to this problem.

Expedient and advantageous embodiments are the object of the subclaims and are explained in greater detail in conjunction with the description of one embodiment.

This invention is based on the general idea of mounting the pressure regulating valve inside the filter housing in such a way that it is isolated from vibration. Pressure pulses which create vibrations occur during operation of a pressure regulating valve. The vibrations produced by the pressure pulses are transferred to the filter housing which is connected to the internal combustion engine or to a vehicle driven by the internal combustion engine either directly and/or via connecting lines. The noises to be prevented according to this invention occur due to vibrations transmitted to the filter housing by the pressure regulating valve.

The fuel filter known from European Patent 0 702 142 A1 does not have the complete vibration isolation of the pressure regulating valve according to this invention. In that case, there is always a fixed, vibration-transmitting connection between the pressure regulating valve and the filter housing at least in an area of the pressure regulating valve.

Figure 2:
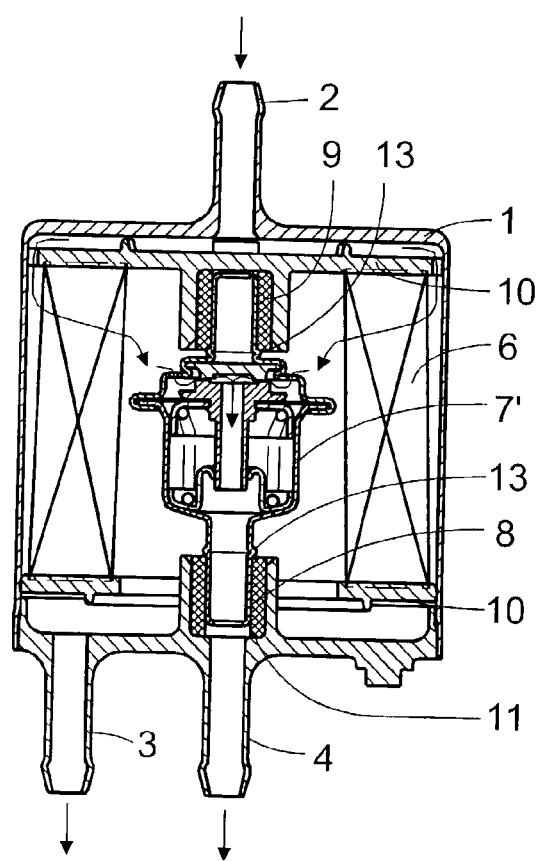

Of the embodiments illustrated in the drawing, the following are each shown in a longitudinal sectional view:

FIG. 1 a line filter with a pressure regulating valve mounted at two points in the filter housing in a vibration-damping manner, FIG. 2 a line filter with a pressure regulating valve mounted in the filter housing only via a vibration-damping mount.

In the embodiment according to FIG. 1, a line filter housing 1 made of metal has two flow-through connections 2, 3, 4 and 5 on each of its opposing end faces where the connections project outward. In the case of a line filter for an internal combustion engine, these connections 2, 3, 4 and 5 have the following function. Connection 2 carries fuel from the fuel tank into the filter housing 1, where the fuel flows through the ring filter element 6 from the outside radially toward the inside radially in accordance with the flow arrows indicated in the figure, and then it comes out of the filter housing 1 as the forward flow, passing through connection 3 to the internal combustion engine.

A pressure regulating valve 7, whose design is essentially known, is mounted in a vibration-damping manner between connections 4 and 5, whose function is described below. The vibration-damping mounts are each made of so-called hose gaskets 8 and 9 which are inserted by pressing. Due to these hose gaskets 8 and 9, which may also be gaskets of any other desired form, the pressure regulating valve 7 is essentially secured sufficiently in both radial and axial directions. In operation of the filter, it is additionally secured against axial displacement of the pressure regulating valve 7 by the hose gaskets 8, 9 by a ring bead 13 which serves as an axial stop and is molded in the connection 4 or 5. These ring beads 13 may be either directly adjacent axially to the respective gasket 8 or 9 or may also engage in the gasket axially and also press it radially for an axially slip-proof seating.

Vibrations cannot be transmitted from the pressure regulating valve 7 to the filter housing 1 through the hose gaskets 8 and 9, which are made of an elastic material, or at least the vibration cannot be transmitted to such an extent that vibration-induced noise would be caused by filter housing 1.

Fuel released by the pressure regulating valve 7 to flow back into the tank flows back into the tank through connection 4. The pressure regulating valve is vented through connection 5 to be able to work against atmospheric pressure in a known manner.

In the filter embodiment according to FIG. 2, the connection 5, which is present in the design according to FIG. 1 for venting the pressure regulating valve 7, is omitted. Otherwise, the function of the line filter according to FIG. 2 is the same as that of the filter according to FIG. 1. Therefore, parts having the same functions are labeled with the same reference notation. Due to the use of a pressure regulating valve 7' which does not have a vent connection, a different mounting of the pressure regulating valve 7' is obtained in the embodiment according to FIG. 2 in comparison with that according to FIG. 1. The vent connection 12 in the embodiment according to FIG. 1 is sealed in the embodiment according to FIG. 2, i.e., it is not functional, and it serves there only as a retaining element. Although the pressure regulating valve 7' has the same mounting in the case of its projecting connection 11 as in the embodiment according to FIG. 1, it is mounted on its opposite end face in a closed end disk 10 of filter element 6. In one embodiment of end disk 10 made of a plastic which has a damping effect, it is possible under some circumstances to completely omit the use of an additional vibration-damping mount between the pressure regulating valve 7' and the end disk 10. In the embodiment illustrated here, however, a separate, vibration-damping mount in the form of a hose gasket 9 is again used.

What is claimed is:

1. A fuel filter for an internal combustion engine having a filter housing made of metal, a filter element and a pressure regulating valve each mounted separately in the filter housing comprising, said pressure regulating valve (7) is mounted in the filter housing in mounts in a vibration damped manner;

said pressure regulating valve (7) is equipped with connections (11, 13) at opposite end faces and within the same axis, with only one of these connections (11, 13) at each of said end faces;

each of said connections (11, 13) is equipped with hose gaskets (8, 9) as vibration damping means;

said hose gaskets (8, 9) are pressed in an annular space between said connections (11, 13) and said mounts.

2. The fuel filter of claim 1,
wherein one of said mounts for mounting the connections (11, 13) of the pressure regulating valve (7) is an opening in the filter housing.

3. A fuel filter for an internal combustion engine having a filter housing made of metal, a filter element and a pressure regulating valve each mounted separately in the filter housing comprising, said pressure regulating valve (7) is mounted in the filter housing in mounts in a vibration damped manner;

said pressure regulating valve (7) is equipped with connections (11, 13) at opposite end faces and within the same axis, with only one of these connections (11, 13) at each of said end faces;

each of said connections (11, 13) is equipped with hose gaskets (8, 9) as vibration damning means;

said hose gaskets (8, 9) are pressed in an annular space between said connections (11, 13) and said mounts; and wherein one of said mounts is an end disk (10) of the filter element (6) adjacent the pressure regulating valve.

* * * * *